(12) United States Patent
Haskara et al.

(10) Patent No.: US 12,697,900 B2
(45) Date of Patent: Aug. 4, 2026

(54) BATTERY PACK BALANCING CONTROLS FOR MULTIPLE BATTERY PACK SYSTEMS

(71) Applicant: GM GLOBAL TECHNOLOGY OPERATIONS LLC, Detroit, MI (US)

(72) Inventors: Ibrahim Haskara, Macomb, MI (US); Venkata Prasad Atluri, Novi, MI (US); Norman K Bucknor, Troy, MI (US); Chandra S Namuduri, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 830 days.

(21) Appl. No.: 18/086,005

(22) Filed: Dec. 21, 2022

(65) Prior Publication Data

US 2024/0208365 A1     Jun. 27, 2024

(51) Int. Cl.
| | |
|---|---|
| *B60L 58/22* | (2019.01) |
| *B60L 3/00* | (2019.01) |
| *B60L 53/62* | (2019.01) |
| *B60L 58/12* | (2019.01) |
| *H02J 7/56* | (2026.01) |
| *H02J 7/60* | (2026.01) |

(52) U.S. Cl.
CPC ............. *B60L 58/22* (2019.02); *B60L 3/0046* (2013.01); *B60L 53/62* (2019.02); *B60L 58/12* (2019.02); *H02J 7/56* (2026.01); *H02J 7/663* (2026.01)

(58) Field of Classification Search
CPC ........ B60L 58/22; B60L 3/0046; B60L 53/62; B60L 58/12; H02J 7/0018; H02J 7/0031; H02J 2310/48; Y02T 10/70; Y02T 10/7072
USPC ......................................................... 320/109
See application file for complete search history.

(56) References Cited

U.S. PATENT DOCUMENTS

| | | | | |
|---|---|---|---|---|
| 2012/0319657 A1* | 12/2012 | Ke | ......................... | H02J 7/0024 320/134 |
| 2014/0340023 A1* | 11/2014 | Shu | ....................... | H02J 7/0018 320/107 |
| 2020/0055405 A1* | 2/2020 | Duan | ..................... | H02J 7/0014 |
| 2020/0406777 A1* | 12/2020 | Nguyen | ................... | B60L 53/35 |
| 2021/0226267 A1* | 7/2021 | Books | ........................ | H02J 7/14 |
| 2022/0185148 A1* | 6/2022 | Kim | ......................... | B60L 53/22 |
| 2022/0224125 A1* | 7/2022 | Thorsøe | ............... | H02J 7/0048 |

(Continued)

*Primary Examiner* — Julian D Huffman
*Assistant Examiner* — Aiman Bickiya
(74) *Attorney, Agent, or Firm* — CANTOR COLBURN LLP

(57) ABSTRACT

An electric vehicle charging system including a switchable battery having at least two battery packs that are selectively arranged in one of a fast-charging configuration and a drive configuration. The fast-charging configuration includes connecting each of the at least two battery packs to separate charging sources and the drive configuration includes connecting each of the at least two battery packs in parallel. The charging system including a plurality of sensors configured to measure one or more characteristics of the at least two battery packs and a controller configured to calculate an adjustment to a charging current of one of the at least two battery packs based on the one or more characteristics and transmit the adjustment to a charging source associated with the one of the at least two battery packs.

18 Claims, 6 Drawing Sheets

(56)           References Cited

U.S. PATENT DOCUMENTS

2022/0239119  A1 *   7/2022  Liu  ..................... H01M 10/482
2024/0162721  A1 *   5/2024  Griffith  ................ H02J 7/0047

* cited by examiner

100

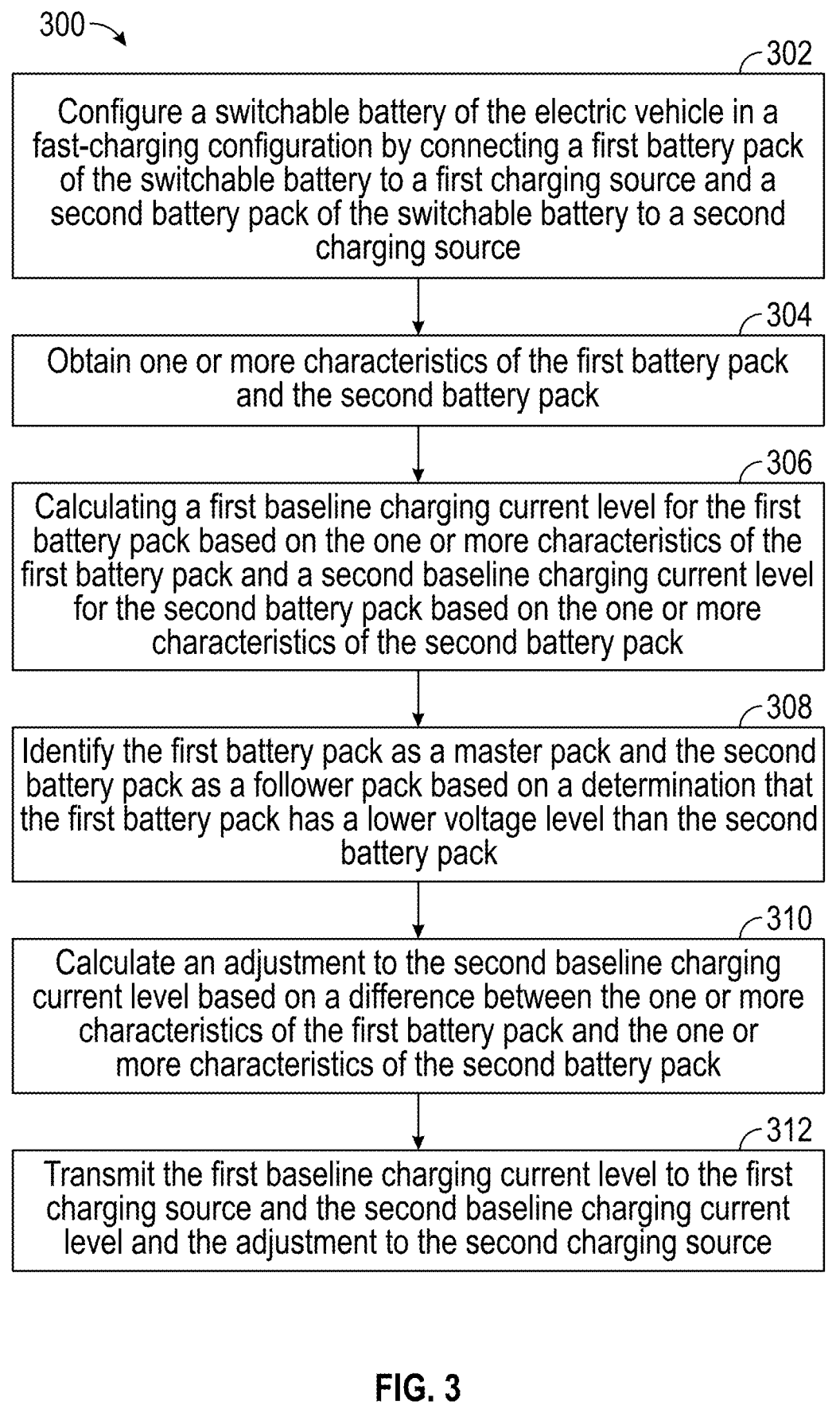

300

302

Configure a switchable battery of the electric vehicle in a fast-charging configuration by connecting a first battery pack of the switchable battery to a first charging source and a second battery pack of the switchable battery to a second charging source

304

Obtain one or more characteristics of the first battery pack and the second battery pack

306

Calculating a first baseline charging current level for the first battery pack based on the one or more characteristics of the first battery pack and a second baseline charging current level for the second battery pack based on the one or more characteristics of the second battery pack

308

Identify the first battery pack as a master pack and the second battery pack as a follower pack based on a determination that the first battery pack has a lower voltage level than the second battery pack

310

Calculate an adjustment to the second baseline charging current level based on a difference between the one or more characteristics of the first battery pack and the one or more characteristics of the second battery pack

312

Transmit the first baseline charging current level to the first charging source and the second baseline charging current level and the adjustment to the second charging source

FIG. 3

BATTERY PACK BALANCING CONTROLS FOR MULTIPLE BATTERY PACK SYSTEMS

INTRODUCTION

The disclosure relates to electric vehicles, and more particularly to battery pack balancing controls for multiple battery pack systems.

Electric vehicles (EVs) such as battery electric vehicles (BEVs), hybrid vehicles, and/or fuel cell vehicles include one or more electric machines and a battery system. The battery system includes one or more battery cells, modules, and/or packs that are connected in series and/or parallel. A power control system is used to control the charging and/or discharging of the battery system during charging and/or driving. During use, the electric machine is operated as a motor for propulsion and as a generator for regeneration during braking. The power control system includes a power inverter module that is arranged between the battery system and the electric machine.

SUMMARY

In one exemplary embodiment, an electric vehicle charging system is provided. The electric vehicle charging system includes a switchable battery including at least two battery packs that are selectively arranged in one of a fast-charging configuration and a drive configuration, wherein the fast-charging configuration includes connecting each of the at least two battery packs to separate charging sources and the drive configuration includes connecting each of the at least two battery packs in parallel. The electric vehicle charging system also includes a plurality of sensors configured to measure one or more characteristics of the at least two battery packs and a controller configured to control the configuration of the switchable battery, calculate an adjustment to a charging current of one of the at least two battery packs based on the one or more characteristics, and transmit the adjustment to a charging source associated with the one of the at least two battery packs. The controller calculates the adjustment to the charging current to balance at least one of the one or more characteristics of the at least two battery packs.

In addition to the one or more features described herein, the one or more characteristics includes one or more of a terminal voltage, an open circuit voltage, a state-of-charge, a temperature and an input current level.

In addition to the one or more features described herein, the controller is further configured to identify a first battery pack of the at least two battery packs as a master pack, wherein the first battery pack has a lowest voltage level of the at least two battery packs.

In addition to the one or more features described herein, the one of the at least two battery packs for which the adjustment to the charging current is calculated does not include the master pack.

In addition to the one or more features described herein, the identification of the master pack is performed periodically during charging of the switchable battery.

In addition to the one or more features described herein, the controller is configured to only calculate the adjustment to the charging current based on a determination that a state-of-charge of at least one of the at least two battery packs is above a threshold minimum.

In addition to the one or more features described herein, the controller is further configured to monitor the one or more characteristics of the at least two battery packs and to identify an anomaly with one of the at least two battery packs or the charging source for one of the at least two battery packs.

In addition to the one or more features described herein, the controller is further configured to disable a battery pack of the at least two battery packs based on a determination that the anomaly is a charging fault with the battery pack.

In one exemplary embodiment, a method for charging an electric vehicle is provided. The method includes configuring a switchable battery of the electric vehicle in a fast-charging configuration by connecting a first battery pack of the switchable battery to a first charging source and a second battery pack of the switchable battery to a second charging source and obtaining one or more characteristics of the first battery pack and the second battery pack. The method also includes calculating a first baseline charging current level for the first battery pack based on the one or more characteristics of the first battery pack and calculating a second baseline charging current level for the second battery pack based on the one or more characteristics of the second battery pack. The method further includes identifying the first battery pack as a master pack and the second battery pack as a follower pack based on a determination that the first battery pack has a lower voltage level than the second battery pack and calculating an adjustment to the second baseline charging current level based on a difference between the one or more characteristics of the first battery pack and the one or more characteristics of the second battery pack. The method also includes transmitting the first baseline charging current level to the first charging source and transmitting the second baseline charging current level and the adjustment to the second charging source.

In addition to the one or more features described herein, the one or more characteristics includes one or more of a terminal voltage, an open circuit voltage, a state-of-charge, a temperature and an input current level.

In addition to the one or more features described herein, the identification of the master pack is performed periodically during charging of the switchable battery.

In addition to the one or more features described herein, the adjustment is a reduction to the second baseline charging current level.

In addition to the one or more features described herein, the adjustment to the second baseline charging current level is configured to balance at least one of the one or more characteristics to the first battery pack and the second battery pack.

In addition to the one or more features described herein, the identifying the first battery pack as the master pack and calculating the adjustment to the second baseline charging current level are only performed based on a determination that a state-of-charge of at least one of the first battery pack and the second battery pack is above a threshold minimum.

In one exemplary embodiment, an electric vehicle is provided. electric vehicle includes a first charging source, a second charging source, and a switchable battery including a first battery pack and a second battery pack that are selectively arranged in one of a fast-charging configuration and a drive configuration, wherein the fast-charging configuration includes connecting a first battery pack to the first charging source and the second battery pack to the second charging source and the drive configuration includes connecting each of the at least two battery packs in parallel. The electric vehicle also includes a plurality of sensors configured to measure one or more characteristics of the first battery pack and the second battery pack and a controller. The controller is configured to control the configuration of the switchable battery, calculate an adjustment to a charging current of one of the first battery pack and the second battery pack based on the one or more characteristics, and transmit the adjustment to a charging source associated with the one of the first battery pack and the second battery pack. The controller calculates the adjustment to the charging current to balance at least one of the one or more characteristics of the first battery pack and the second battery pack.

In addition to the one or more features described herein, the one or more characteristics includes one or more of a terminal voltage, an open circuit voltage, a state-of-charge, a temperature and an input current level.

In addition to the one or more features described herein, the controller is further configured to identify the first battery pack as a master pack, wherein the first battery pack has a lowest voltage level of the second battery pack.

In addition to the one or more features described herein, the adjustment to the charging current is calculated for the second battery pack.

In addition to the one or more features described herein, the identification of the master pack is performed periodically during charging of the switchable battery.

In addition to the one or more features described herein, the controller is configured to only calculate the adjustment to the charging current based on a determination that a state-of-charge of at least one of the first battery pack and the second battery pack is above a threshold minimum.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 is a flowchart illustrating a method for charging an electric vehicle in accordance with an exemplary embodiment:

DETAILED DESCRIPTION

The following description is merely exemplary in nature and is not intended to limit the present disclosure, its application or uses.

Electric vehicles (EVs) such as battery electric vehicles (BEVs), hybrid vehicles, and/or fuel cell vehicles include one or more electric machines and a battery system. A power control system is used to control the charging and/or discharging of the battery system. In exemplary embodiments, the battery system includes a switchable battery that includes multiple battery packs that are capable of being selectively connected to each other parallel. The multiple battery packs can also be selectively isolated from each other and separately connected to different charging sources. A power control system can be used to control the switching between two or more configurations. For example, in a drive mode the power control system configures the multiple battery packs in parallel with each other and in a fast-charging mode the power control system separately connects each of the multiple battery packs to different charging sources.

One drawback of independently charging the battery packs of a switchable battery is that the voltage level of the battery packs may not be equal throughout the charging process and at the end of the charging process. As a result, when the battery packs of the switchable battery are re-connected to each other in parallel, the battery packs with lower voltage levels will experience an inrush of current that can damage the battery pack. The methods and systems disclosed herein provide for charging a switchable battery pack of an electric vehicle that is configured to ensure that the voltages of the battery packs remain within a threshold level of each other throughout the charging process.

Figure 1:
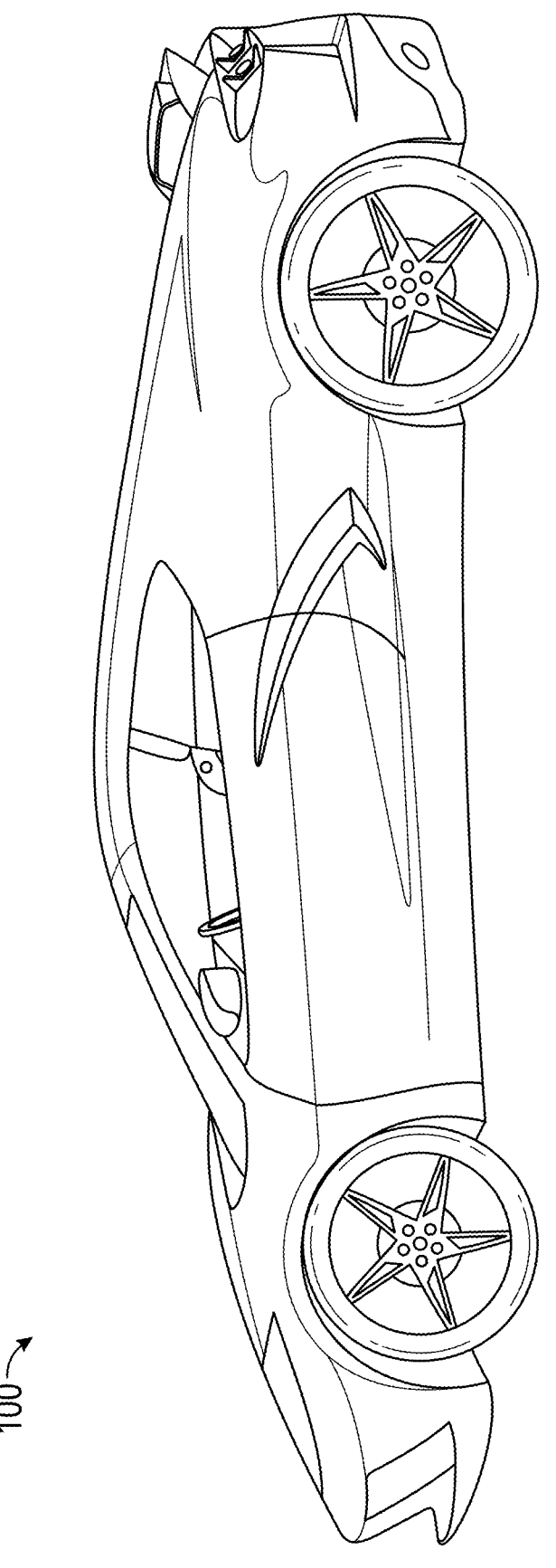
FIG. 1 is a schematic diagram of a vehicle for use in conjunction with one or more embodiments of the present disclosure.

Referring now to FIG. 1, a schematic diagram of a vehicle 100 for use in conjunction with one or more embodiments of the present disclosure is shown. The vehicle 100 includes a switchable battery 210. In one embodiment, the vehicle 100 is a hybrid vehicle that utilizes both an internal combustion engine and an electric motor powered by the switchable battery. In another embodiment, the vehicle 100 is an electric vehicle that only utilizes electric motors that are powered by the switchable battery.

Figure 2:
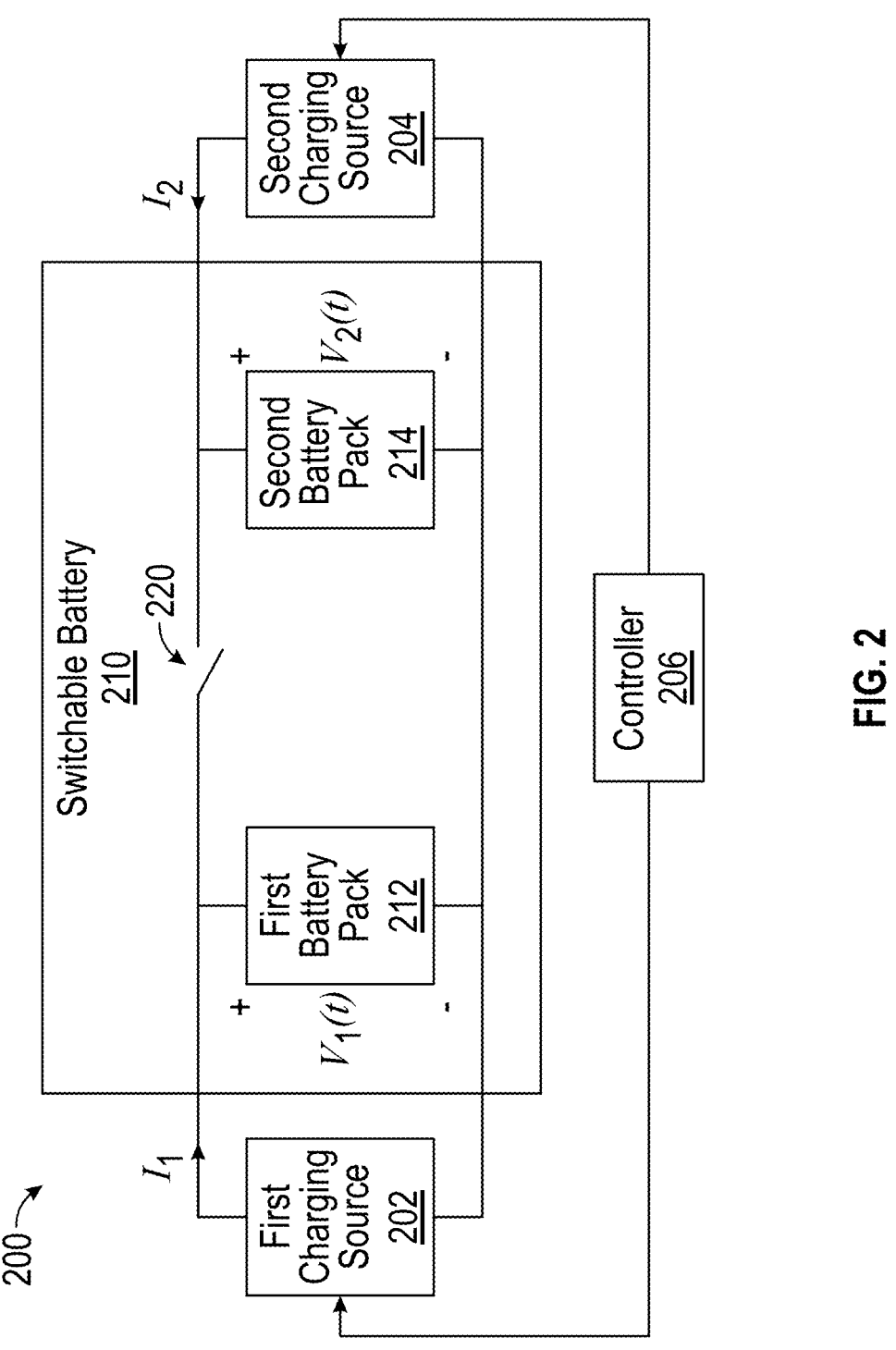
FIG. 2 is a block diagram illustrating an electric drive system of a vehicle in accordance with an exemplary embodiment.

Referring now to FIG. 2 a block diagram illustrating a charging system 200 of an electric vehicle in accordance with an exemplary embodiment is shown. The charging system 200 includes a first charging source 202, a second charging source 204, a controller 206, and a switchable battery 210. In exemplary embodiments, the switchable battery 210 includes a first battery pack 212 and a second battery pack 214 that can be selectively connected to each other in parallel or isolated from one another via switch 220. In one embodiment, the operation of the switch 220 is controlled by the controller 206.

In exemplary embodiments, the controller 206 is configured to monitor a first voltage level ($V_1$) of the first battery pack 212 and a second voltage level ($V_2$) of the second battery pack 214. The controller 206 may also monitor other characteristics of the first battery pack 212 and the second battery pack 214, which include one or more of a terminal voltage, an open circuit voltage, a state-of-charge, a temperature, and an input current level. In exemplary embodiments, the controller 206 designates one of the first battery pack 212 and the second battery pack 214 as a master pack. In one embodiment, the battery pack with the lowest voltage level is designated as the master pack and the other battery pack(s) is designated as a follower pack(s).

In exemplary embodiments, during a fast-charging mode, the switch 220 is in an open configuration to, at least partially, isolate the first battery pack 212 from the second battery pack 214. The first charging source 202 is configured to provide a first charging current ($I_1$) and the second charging source is configured to provide a second charging current ($I_2$). In general, the baseline charging currents are determined by a battery management system based on the battery voltage, temperature and state of charge. In exemplary embodiments, the controller 206 instructs the charging source providing current to the follower packs to reduce the current provided to the follower pack to balance the voltage level of the master pack and the follower packs.

In one example, the first battery pack 212 has a lower voltage level ($V_1$) than the voltage level ($V_2$) of the second battery pack 214 and the first battery pack 212 is therefore designated as the master pack by the controller 206. Once the first battery pack 212 is designated as the master pack, the controller 206 calculates an adjustment to be applied to the second charging current ($I_2$). In exemplary embodiments, the adjustment is based on the difference between the first voltage level ($V_1$) and a second voltage level ($V_2$). In one embodiment, the adjustment is calculated using the following equation:

$$\Delta I = k_p (V_2 - V_1) + k_I \int (V_2 - V_1)$$

Where $k_p$ and $k_I$ are constants. As a result, of reducing the current applied to the second battery pack 214, the second battery pack 214 will charge at a slower rate than the first battery pack 212 and the voltage of the first battery pack 212 will eventually equalize with the voltage of the second battery pack 214. While a voltage difference feedback control system has been described, other feedback control systems may also be used. For example, the current adjustment can be configured as a dynamic scaling to the baseline charge current, e.g., $I_{applied}=g*I_{baseline}$ where g is determined from a feedback controller and where a value of less than ones would mean a reduction in charge current, which effectively reduces the charging speed.

In exemplary embodiments, the controller 206 is configured to reduce the charging speed of battery packs designated as follower packs such that the voltage level of the master pack will increase at a faster rate than the follower packs. As a result, the voltage of the master pack will increase to approximately the same as the voltage level of the follower pack. In exemplary embodiments, the identification and designation of master and follower packs are performed at the beginning of the fast-charging process and the designations can be continually updated during the fast-charging process.

Referring now to FIG. 3 a flowchart illustrating a method 300 for charging an electric vehicle in accordance with an exemplary embodiment is shown. At block 302, the method 300 includes configuring a switchable battery of the electric vehicle in a fast-charging configuration by connecting a first battery pack of the switchable battery to a first charging source and a second battery pack of the switchable battery to a second charging source. At block 304, the method 300 includes obtaining one or more characteristics of the first battery pack and the second battery pack. The one or more characteristics includes one or more of a terminal voltage, an open circuit voltage, a state-of-charge, a temperature, and an input current level.

At block 306 the method includes calculating a first baseline charging current level for the first battery pack based on the one or more characteristics of the first battery pack and a second baseline charging current level for the second battery pack based on the one or more characteristics of the second battery pack. Next, at block 308, the method 300 includes identifying the first battery pack as a master pack and the second battery pack as a follower pack based on a determination that the first battery pack has a lower voltage level than the second battery pack. In exemplary embodiments, the identification of the master pack is performed periodically during the charging of the switchable battery.

Next, at block 310, the method 300 includes calculating an adjustment to the second baseline charging current level based on a difference between the one or more characteristics of the first battery pack and the one or more characteristics of the second battery pack. In one embodiment, the adjustment to the second baseline charging current level is based on a difference between a voltage of the first battery pack and a voltage of the second battery pack. In exemplary embodiments, the adjustment is a reduction to the second baseline charging current level. In exemplary embodiments, the adjustment to the second baseline charging current level is configured to balance at least one of the one or more characteristics of the first battery pack and the second battery pack. The method 300 concludes at block 312 by transmitting the first baseline charging current level to the first charging source and transmitting the second baseline charging current level and the adjustment to the second charging source.

In exemplary embodiments, identifying the first battery pack as the master pack and calculating the adjustment to the second baseline charging current level are only performed based on a determination that a state-of-charge of at least one of the first battery pack and the second battery pack is above a threshold minimum. For example, when the switchable battery is first configured in the fast-charging mode and connected to the first and second charging sources, the full charging current from the charging sources are applied to the first battery pack and the second battery pack until the state-of-charge of at least one of the first battery pack and the second battery pack is above a threshold minimum, such as seventy percent.

Figure 4:
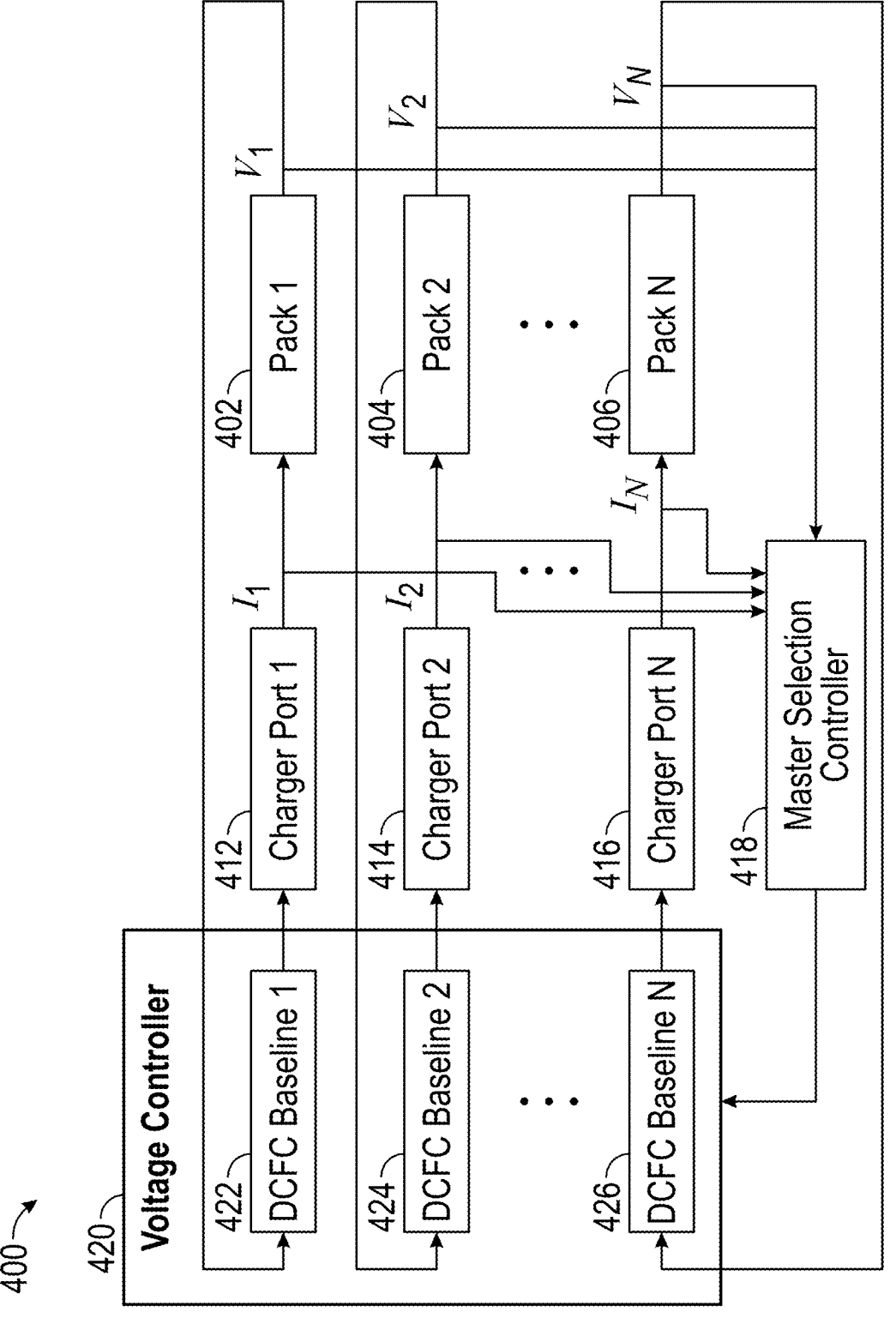
FIG. 4 is a block diagram illustrating a charging system for controlling the charging of multiple battery packs for an electric vehicle in accordance with an exemplary embodiment.

Referring now to FIG. 4 a schematic illustrating a system 400 for controlling the charging of multiple battery packs for an electric vehicle in accordance with an exemplary embodiment is shown. As illustrated, the system 400 includes multiple battery packs 402, 404, and 406 that are respectively connected to multiple charger ports 412, 414, and 416. The system 400 also includes a voltage controller 420 that is configured to receive the voltage levels ($V_1$, $V_2$, and $V_N$) from the battery packs 402, 404, and 406 and to determine baseline current levels 422, 424, and 426 that each charger port 412, 414, and 416 should apply to its respective battery packs 402, 404, and 406. In addition, the voltage controller 420 is also configured to receive other data regarding the battery packs 402, 404, and 406, such as a terminal voltage, the open circuit voltage, a state-of-charge, temperature and input current level.

The system 400 also includes a master selection controller 418 that is configured to identify one of the battery packs 402, 404, and 406 as a master pack and the remaining battery packs as follower packs. Once the master selection controller 418 has identified a master pack, the master selection controller 418 calculates an adjustment to the baseline current level for each follower pack and transmits the adjustments to the voltage controller 420. The voltage controller 420 utilizes the adjustment data received from the master selection controller 418 to select the baseline current level that each charger port 412, 414, and 416 should apply to its respective battery packs 402, 404, and 406.

In exemplary embodiments, voltage controller 420 is configured to reduce the charging speed of the battery packs designated as follower packs such that the voltage level of the master pack will increase at a faster rate than the follower packs. As a result, the voltage of the master pack will increase to approximately the same as the voltage level of the master pack. In exemplary embodiments, the master selection controller 418 is configured to identify and designate the master and follower packs at the beginning of the fast-charging process and the designations can be continually updated during the fast-charging process based on detected changes to the voltage levels ($V_1$, $V_2$, and $V_N$) of the battery packs 402, 404, and 406.

In exemplary embodiments, the voltage levels ($V_1$, $V_2$, and $V_N$) are open circuit voltages of the battery packs 402, 404, and 406. In one embodiment, the battery open circuit voltage is computed by comparing the resistive delta from the measured terminal voltage by using battery current and estimate resistance. In other embodiments, the voltage controller 420 and the master selection controller 418 are configured to adjust the charging currents based on the temperature and the state-of-charge of the battery packs 402, 404, and 406.

Figure 5:
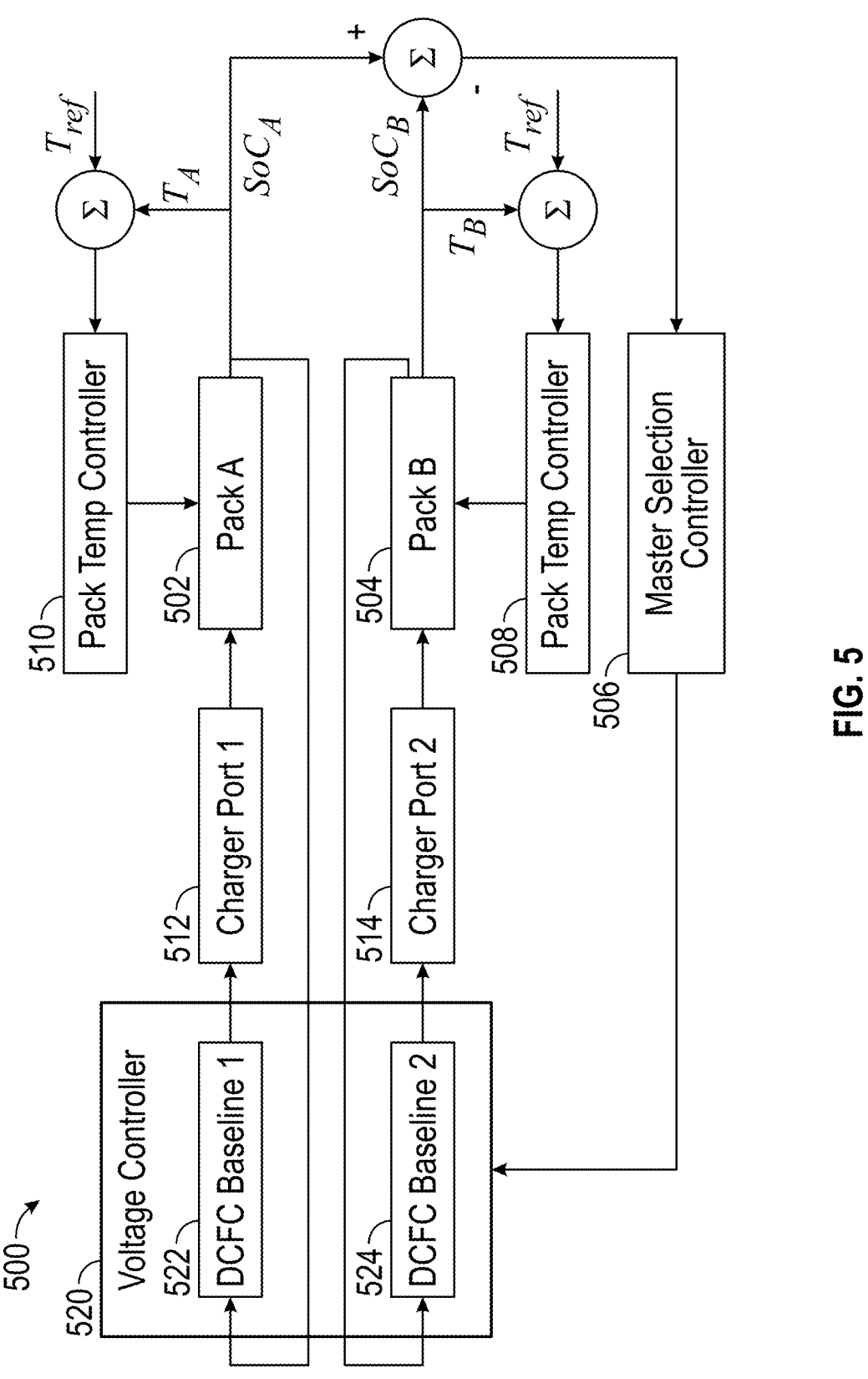
FIG. 5 is a schematic diagram illustrating a system for balancing the charge of battery packs of an electric vehicle using thermal controls in accordance with an exemplary embodiment.

Referring now to FIG. 5, a schematic diagram of a system 500 for balancing the charge of battery packs of an electric vehicle using thermal controls in accordance with an exemplary embodiment is shown. In exemplary embodiments, battery pack A 502 and battery pack B 504 are identical battery packs that are cooled by temperature controllers 508, 510, respectively. The temperature controllers 508, 510 are configured to maintain the temperature of battery pack A 502 and battery pack B 504 at a desired reference temperature ($T_{ref}$).

In exemplary embodiments, the voltage controller 520 is configured to determine a baseline charging current level 522, 524 that will be applied to each battery pack by the charging ports 512, 514. The baseline charging current level 522, 524 is based at least in part on the state-of-charge of the battery packs ($SoC_A$ and $SoC_B$).

In addition, the state-of-charge of the battery packs ($SoC_A$ and $SoC_B$) are analyzed by a master selection controller 506. The master selection controller 506 is configured to identify any imbalance between the $SoC_A$ and $SoC_B$ and to instruct the voltage controller 520 to adjust the baseline current 522, 524 that is supplied by the charger ports 512, 514 to the battery packs. The master selection controller 506 designates the battery pack having the lowest state-of-charge as a master battery pack and the other battery pack as a follower battery pack. In exemplary embodiments, the capacity (the maximum charge amount that the pack can have) of each battery pack may be different due to pack-to-pack variations and the age of the battery packs. Balancing algorithms can use estimates of individual pack capacities so that state of charges capture the present the capacity of each pack. In case of unknown pack capacities, the open circuit voltage balancing can indirectly balance charge levels as well due to dependence of state of charge, open circuit voltage and battery temperature. The master selection controller 506 is further configured to calculate and transmit an adjustment to the baseline charging current level for the follower battery pack to the voltage controller 520.

Figure 6:
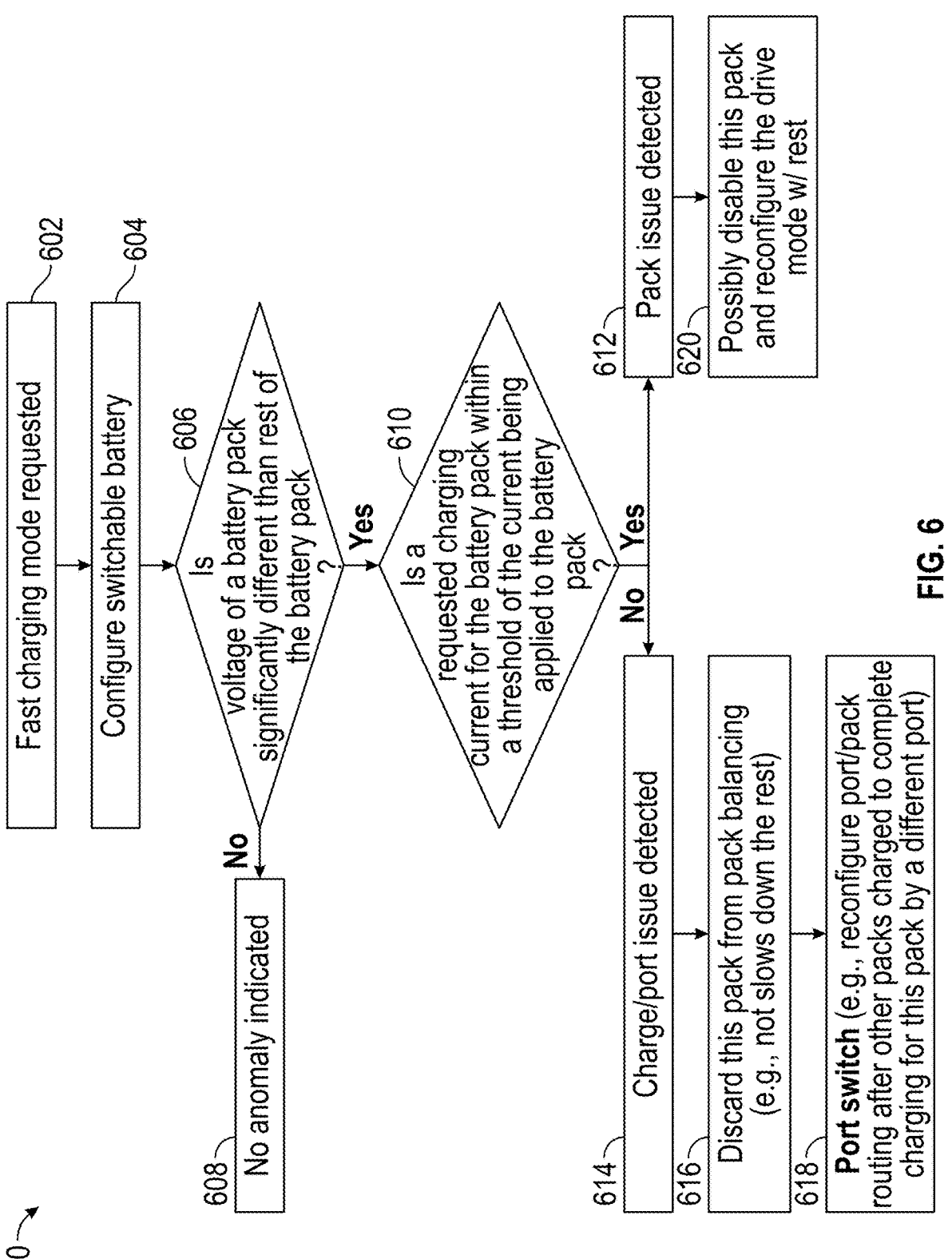
FIG. 6 is a flowchart illustrating a method for identifying an anomaly in a charging system of an electric vehicle in accordance with an exemplary embodiment.

Referring now to FIG. 6, a flowchart illustrating a method 600 for identifying an anomaly in a charging system of an electric vehicle in accordance with an exemplary embodiment is shown. At block 602 the electric vehicle is requested to perform fast-charging. Next, at block 604, the electric vehicle configures the switchable battery into a fast-charging configuration. Next, at block 606, it is determined whether a voltage of a battery pack of the switchable battery is significantly different than the rest of the battery packs of the switchable battery. If all of the battery packs have voltages within a threshold range of one another, the method 600 proceeds to block 608 and no anomaly is indicated. Otherwise, the method 600 proceeds to block 610 and it is determined whether a requested charging current for the identified battery pack is within a threshold of the charging current being applied to the battery pack. If the requested charging current for the identified battery pack is not within the threshold of the charging current being applied to the battery pack, the method 600 proceeds to block 614 and an anomaly is indicated with the charger or charging port. Once an anomaly is indicated with the charger or charging port, at block 616, the method 600 removes the pack associated with the anomalous charger or charging port from the battery pack balancing algorithm. If the requested charging current for the identified battery pack is within the threshold of the charging current being applied to the battery pack, the method 600 proceeds to block 612 and indicates an anomaly with the battery pack, (i.e., a charging fault, is indicated).

Based on an anomaly being indicated with the charger or charging port, the method 600 proceeds to block 618 and reconfigures the routing between the charging port and battery pack after other battery packs have completed charging to complete charging for the identified battery pack by a different port. Based on an anomaly being indicated with the battery pack, the method 600 proceeds to block 620 and the identified battery pack is disabled, and the drive mode is reconfigured to not use the battery pack.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric vehicle charging system comprising:
a switchable battery including at least two battery packs and a controllable switch that is arranged to selectively isolate the at least two battery packs from one another and connect each of the at least two battery packs to separate charging sources in a fast-charging configuration, and to connect the at least two battery packs in parallel in a drive configuration;
a plurality of sensors configured to measure one or more characteristics of the at least two battery packs; and
a controller configured to:
control the configuration of the switchable battery and operate the controllable switch to select between the fast-charging configuration and the drive configuration;
calculate an adjustment to a charging current of a follower one of the at least two battery packs based on the one or more characteristics; and
transmit the adjustment to a charging source associated with the follower one of the at least two battery packs,
wherein the controller calculates the adjustment to the charging current to balance at least one of the one or more characteristics of the at least two battery packs, the adjustment comprising a dynamic scaling factor that scales a baseline charge current of the follower pack, wherein a value of the scaling factor less than one reduces the applied charging current and thereby reduces a charging speed of the follower pack;
wherein the controller is further configured to identify a first battery pack of the at least two battery packs as a master pack, wherein the first battery pack has a lowest voltage level of the at least two battery packs;
wherein the one of the at least two battery packs for which the adjustment to the charging current is calculated does not include the master pack, and wherein the adjustment for a follower pack is a reduction to a baseline charging current according to a proportional-integral function of a difference between a voltage of the master pack and a voltage of the follower pack.

2. The electric vehicle charging system of claim 1, wherein the one or more characteristics includes one or more of a terminal voltage, an open circuit voltage, a state-of-charge, a temperature and an input current level, wherein the open circuit voltage of each battery pack is computed by comparing a resistive delta from a measured terminal voltage using battery current and an estimated pack resistance.

3. The electric vehicle charging system of claim 1, wherein the identification of the master pack is performed periodically during charging of the switchable battery.

4. The electric vehicle charging system of claim 1 wherein the controller is configured to only identify the master pack and only calculate the adjustment to the charging current based on a determination that a state-of-charge of at least one of the at least two battery packs is above a threshold minimum.

5. The electric vehicle charging system of claim 1, wherein the controller is further configured to monitor the one or more characteristics of the at least two battery packs and to identify an anomaly with one of the at least two battery packs or the charging source for one of the at least two battery packs, to determine whether the anomaly is associated with a charging source or with a battery pack, to remove a battery pack associated with a charging-source anomaly from a battery-pack balancing algorithm, and to reconfigure routing between a charging port and the associated battery pack after other battery packs have completed charging to complete charging for the associated battery pack by a different port.

6. The electric vehicle charging system of claim 5, wherein the controller is further configured to disable a battery pack of the at least two battery packs based on a determination that the anomaly is a charging fault with the battery pack and to reconfigure a drive mode to not use the disabled battery pack.

7. A method for charging an electric vehicle, the method comprising:
configuring a switchable battery of the electric vehicle in a fast-charging configuration by operating a controllable switch to isolate a first battery pack from a second battery pack, and connecting the first battery pack to a first charging source and the second battery pack to a second charging source;
obtaining one or more characteristics of the first battery pack and the second battery pack;
calculating a first baseline charging current level for the first battery pack based on the one or more characteristics of the first battery pack;
calculating a second baseline charging current level for the second battery pack based on the one or more characteristics of the second battery pack;
identifying the first battery pack as a master pack and the second battery pack as a follower pack based on a determination that the first battery pack has a lower voltage level than the second battery pack;
calculating an adjustment for the follower pack, the adjustment comprising a dynamic scaling factor that scales the second baseline charging current level, wherein a value of the scaling factor less than one reduces the applied charging current and thereby reduces a charging speed of the follower pack, the scaling factor being determined according to a proportional-integral function of a difference between a voltage of the master pack and a voltage of the follower pack;
transmitting the first baseline charging current level to the first charging source; and
transmitting the second baseline charging current level and the adjustment to the second charging source.

8. The method of claim 7, wherein the one or more characteristics includes one or more of a terminal voltage, an open circuit voltage, a state-of-charge, a temperature and an input current level, wherein the open-circuit voltage of each battery pack is computed by comparing a resistive delta from a measured terminal voltage using battery current and an estimated pack resistance.

9. The method of claim 7, wherein the identification of the master pack is performed periodically during charging of the switchable battery.

10. The method of claim 7, wherein the adjustment is a reduction to the second baseline charging current level.

11. The method of claim 7, wherein the adjustment to the second baseline charging current level is configured to balance at least one of the one or more characteristics to the first battery pack and the second battery pack.

12. The method of claim 7, wherein the identifying the first battery pack as the master pack and calculating the adjustment to the second baseline charging current level are only performed based on a determination that a state-of-charge of at least one of the first battery pack and the second battery pack is above a threshold minimum.

13. An electric vehicle, comprising:

a first charging source;

a second charging source;

a switchable battery including a first battery pack and a second battery pack that are selectively arranged in one of a fast-charging configuration and a drive configuration, wherein the fast-charging configuration includes connecting the first battery pack to the first charging source and the second battery pack to the second charging source and the drive configuration includes connecting each of the first battery pack and the second battery pack in parallel; and a controllable switch arranged to selectively isolate the first battery pack and the second battery pack from one another in the fast-charging configuration and to connect the first battery pack and the second battery pack in parallel in the drive configuration;

a plurality of sensors configured to measure one or more characteristics of the first battery pack and the second battery pack, the one or more characteristics including an open-circuit voltage of each battery pack, wherein the open-circuit voltage is computed by comparing a resistive delta from a measured terminal voltage using battery current and an estimated pack resistance; and a controller configured to:

control the configuration of the switchable battery and operate the controllable switch to select between the fast-charging configuration and the drive configuration;

identify, during fast-charging, a master one of the first battery pack and the second battery pack as having a lowest voltage level and designate a remaining battery pack as a follower pack, and perform the identification periodically during charging;

calculate an adjustment to a charging current of one of follower pack based on the one or more characteristics; and transmit the adjustment to a charging source associated with follower pack, wherein the controller calculates the adjustment to the charging current to balance at least one of the one or more characteristics of the first battery pack and the second battery pack, the adjustment comprising a dynamic scaling factor that scales a baseline charge current of the follower pack, wherein a value of the scaling factor less than one reduces the applied charging current and thereby reduces a charging speed of the follower pack, the scaling factor being determined according to a proportional-integral function of a difference between a voltage of the master pack and a voltage of the follower pack, and wherein the controller is configured to only identify the master pack and only calculate the adjustment to the charging current based on a determination that a state-of-charge of at least one of the first battery pack and the second battery pack is above a threshold minimum; and monitor the one or more characteristics during fast-charging to identify an anomaly with one of the first battery pack and the second battery pack or with one of the first charging source and the second charging source, to determine whether the anomaly is associated with a charging source or with a battery pack, to remove a battery pack associated with a charging-source anomaly from a battery-pack balancing algorithm, to reconfigure routing between a charging port and the associated battery pack after other battery packs have completed charging to complete charging for the associated battery pack by a different port, and to disable a battery pack when the anomaly is a charging fault with the battery pack and to reconfigure a drive mode to not use the disabled battery pack.

14. The electric vehicle of claim 13, wherein the adjustment to the charging current is computed according to $\Delta I = kp(V2-V1) + kI \int(V2-V1)$, where V1 is a voltage of the master pack and V2 is a voltage of the follower pack, and kp and kI are constants.

15. The electric vehicle of claim 13, wherein the state-of-charge threshold minimum is approximately seventy percent.

16. The electric vehicle of claim 13, wherein baseline charging current levels for the first battery pack and the second battery pack are determined by a battery management system based on battery voltage, temperature, and state of charge.

17. The electric vehicle of claim 13, wherein determining whether an anomaly is associated with a charging source includes determining that a requested charging current for an identified one of the first battery pack and the second battery pack is not within a threshold of a charging current being applied to the identified battery pack.

18. The electric vehicle charging system of claim 1, wherein the controller is configured to identify the master pack and calculate the adjustment to the charging current only when a state-of-charge of at least one of the at least two battery packs is above approximately seventy percent.

\* \* \* \* \*